Aug. 28, 1962    TAKESHI GOSHIMA    3,051,067
AUTOMATIC CONTROL MECHANISM FOR PRESET IRIS
DIAPHRAGMS OF PHOTOGRAPHIC CAMERAS
Filed July 29, 1957    3 Sheets-Sheet 1

INVENTOR.
TAKESHI GOSHIMA
BY
ATTORNEY

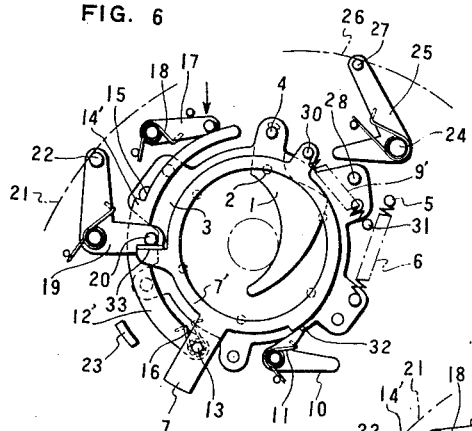
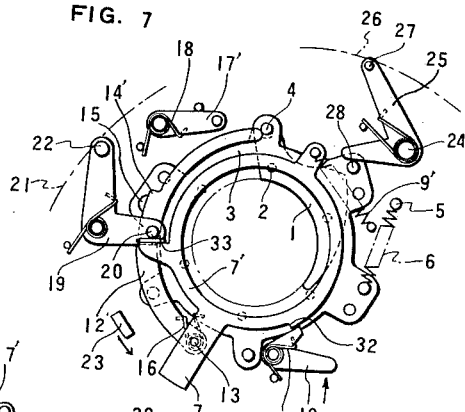
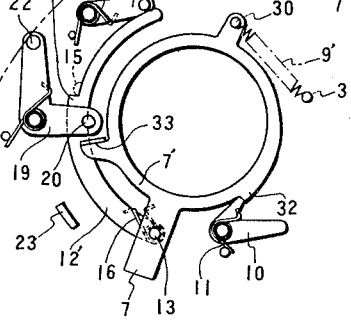
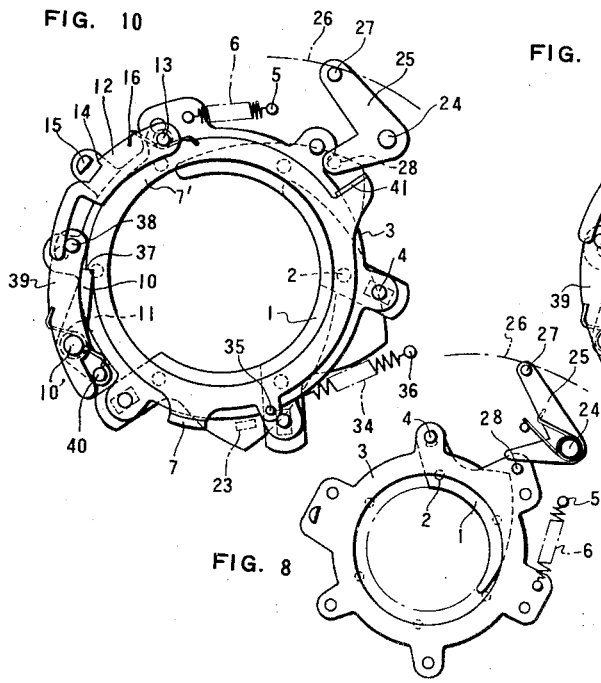
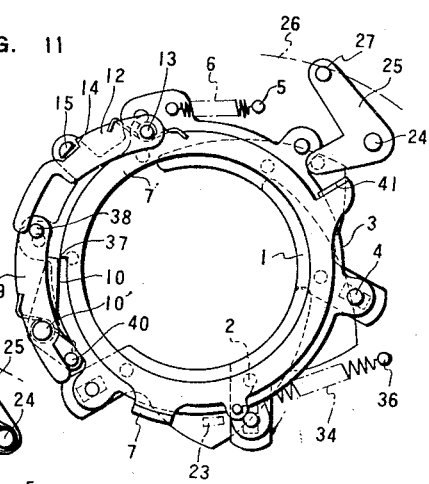
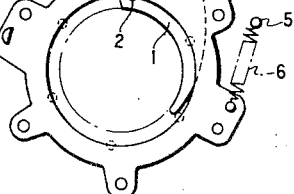

Aug. 28, 1962  TAKESHI GOSHIMA  3,051,067
AUTOMATIC CONTROL MECHANISM FOR PRESET IRIS
DIAPHRAGMS OF PHOTOGRAPHIC CAMERAS
Filed July 29, 1957  3 Sheets-Sheet 3
FIG. 12
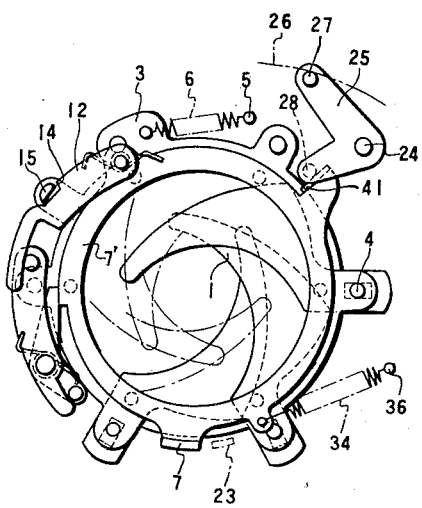
FIG. 13
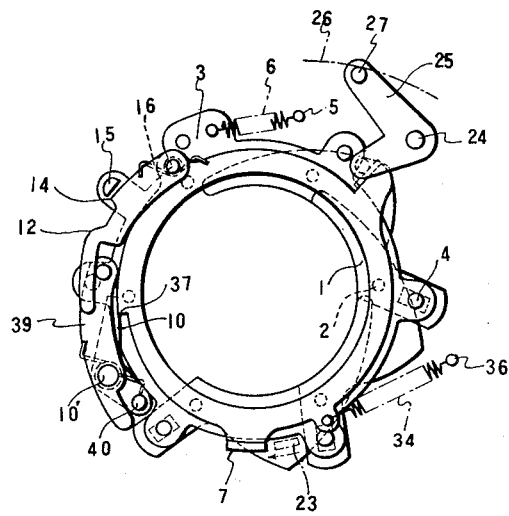
FIG. 14
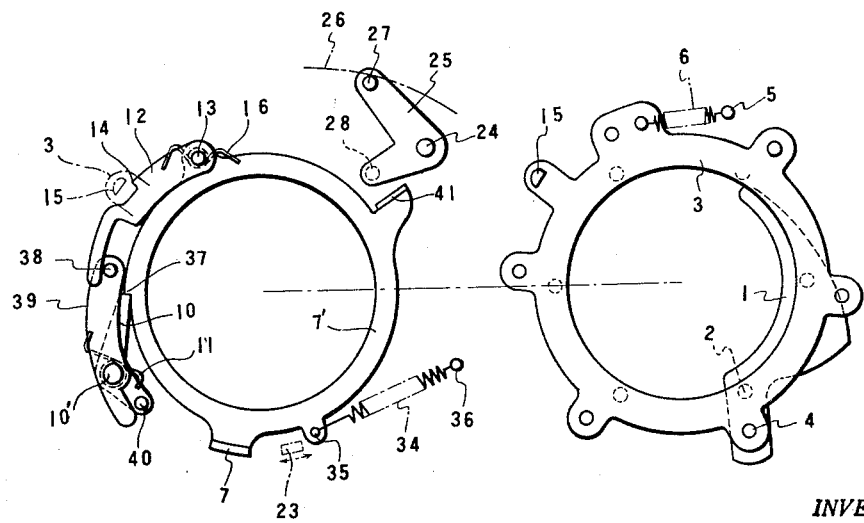
INVENTOR.
TAKESHI GOSHIMA
BY
ATTORNEY United States Patent Office 3,051,067
Patented Aug. 28, 1962

3,051,067
AUTOMATIC CONTROL MECHANISM FOR PRE-
SET IRIS DIAPHRAGMS OF PHOTOGRAPHIC
CAMERAS
Takeshi Goshima, Tokyo, Japan, assignor to Canon Camera Company, Inc., Otaku, Japan, a corporation of Japan
Filed July 29, 1957, Ser. No. 674,804
Claims priority, application Japan Aug. 3, 1956
9 Claims. (Cl. 95—64)

This invention relates to automatic control mechanisms for preset iris diaphragms in lenses for photographic cameras, particularly for reflex cameras.

An object of the present invention is to provide an automatic preset diaphragm control mechanism to operate the diaphragm lamellae quickly, that is, to open the diaphragm to its full aperture as soon as an exposure has been made.

Another object is to provide an objective having a diaphragm which is fully open excepting only while the shutter is operating to make an exposure.

A further object is to improve reflex cameras so that the photographer can observe the subject being photographed through the viewing glass immediately after he has made an exposure.

Many automatic preset diaphragms have been proposed but none opens the diaphragm as soon as an exposure has been made. Some prior art mechanisms open the diaphragm to its full aperture when the shutter release button returns to its preoperated position. Such diaphragms open slowly as the shutter release button restores, and it is not possible under such conditions to observe too well the photographic subject on the ground glass. Other types of prior known diaphragms remain in their small aperture opening positions after an exposure is made, the diaphragm opening to its full aperture only after the next tensioning of the shutter. This invention eliminates the above disadvantages and provides an improved camera which is very convenient to use, and gives a very reliable feeling when the photographer operates the camera.

In order to keep the aperture of the iris diaphragm fully open at all times, other than when making an exposure, and to close it down to a predetermined opening when and while an exposure is made, an early preset diaphragm for reflex cameras was designed to manually stop down the diaphragm aperture, that is, the diaphragm adjusting ring was turned by one hand to the required position and the shutter release button was operated by the other hand. This early type was improved and the separate operation of the diaphragm adjusting ring was eliminated, a spring action replacing the manual rotation of the diaphragm adjusting ring. Recently an automatic device has been introduced in which the spring to drive the diaphragm adjusting ring is automatically tensioned by either the shutter tensioning or the film winding operation, and the means for stopping down to the predetermined diaphragm aperture is coupled to the reflex mirror in such manner that the driving spring of the diaphragm ring operates when the reflex mirror is completely clear of the optical path of the objective. These devices, however, still have disadvantages, particularly in that, while the manually operable device can be easily and simply constructed, it lacks quick operation, while in the improved automatic device the iris diaphragm is maintained in the closed position after an exposure is made. There are two types of reflex cameras, one providing a mirror which does, and the other a mirror which does not, revert to the viewing position after an exposure is made. Similarly, there are two types of preset diaphragms, one type diaphragm does not, while the other type diaphragm does, revert to the full open aperture position after an exposure is made. The latter type diaphragm, however, reverts to its full open aperture only in accordance with the release of the shutter release button; if the release button is released slowly or gradually, the diaphragm will open gradually.

There has never been introduced a reflex camera provided with the former type (reverting) reflex mirror and a diaphragm which opens quickly after an exposure is made independently of the speed with which the release button is released. In a device to perform the iris diaphragm operation coupled to the reflecting mirror, it is necessary to install a drive spring of relatively strong power, since, particularly in conventional mechanisms, the iris diaphragm is driven by a power spring to operate the reflecting mirror. If such strong springs are used to operate the reflex mirrors of interchangeable objective type reflex cameras, the strong drive springs may damage the cameras because of the excessive forces produced if the shutter and mirror should be operated without a photographic objective lens having previously been inserted in the objective aperture of the camera. In elimination of such, and other, shortcomings, the automatic preset iris diaphragm control mechanism of the instant invention has a special tensioning lever provided with a spring which is tensioned by the shutter winding operation. Pivotally mounted on the tensioning lever, a coupling lever engages a diaphragm ring which tends to open the diaphragm by a spring. When the shutter release button is depressed and the reflecting mirror is swung up, that is, clear of the optical path of the objective, a latching arrangement of the tension lever is released as soon as the mirror reaches the upswung position, and the diaphragm is stopped down to the predetermined aperture by means of the coupling lever. Thereafter the coupling lever is disengaged from the diaphragm ring by either the closure of the shutter completing an exposure, or the completion of the return movement of the reflecting mirror to its downswung position in the optical path, and the diaphragm ring under the tension of a restoring spring, reverts to its position at which the aperture is fully open.

The invention accordingly consists in the features of construction, the combination of elements and the arrangement of parts in the illustrative embodiments hereinafter described, of which the scope will be indicated in the claims.

In the accompanying drawing, in which three differing embodiments of the invention are shown:

FIG. 6 illustrates the second embodiment with the diaphragm stopped down to a predetermined aperture when making an exposure;

FIG. 7 illustrates the second embodiment with the diaphragm fully opened after the exposure is made;

FIGS. 8 and 9 illustrate the relative positioning of each member comprising the mechanism of such second embodiment;

FIG. 10 illustrates the diaphragm control mechanism of a third embodiment with the tension lever tensioned;

FIG. 11 illustrates such third embodiment when the latching of the tension lever has just been released after the reflex mirror has swung up;

FIG. 12 illustrates the mechanism of such third embodiment with the diaphragm lamellae stopped down to a predetermined aperture to make an exposure;

FIG. 13 illustrates the diaphragm lamellae thereof returned to the fully open aperture; and FIG. 14 illustrates the relative position between each component of the third embodiment.

Figure 3:
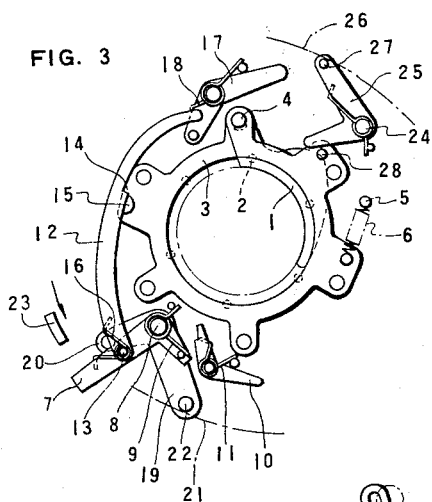
FIG. 3 illustrates the diaphragm control mechanism with the diaphragm again fully opened after an exposure.
Figure 5:
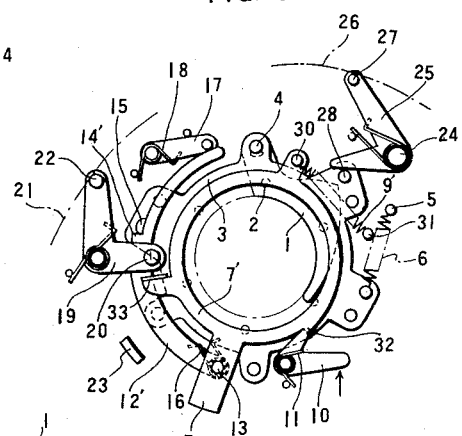
FIG. 5 illustrates a second embodiment of the present invention in which the tension lever is tensioned.
Figure 4:
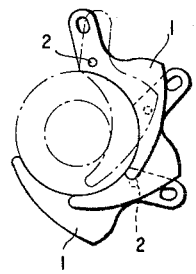
FIG. 4 illustrates the shape of the diaphragm lamellae and the manner of their assembly.

In the embodiment of the present invention shown in FIGURES 1 to 4, each diaphragm lamella 1 of a plurality thereof is pivotally mounted in a diaphragm ring, in the well known manner, (in FIGS. 1 to 3 one lamella is shown for simplicity, while but three are shown in FIG. 4) by a pivot 2 which is riveted to the diaphragm lamella and is journalled in a stationary diaphragm ring, not shown. A diaphragm operating ring 3 is coaxial with the stationary diaphragm ring and is rotatable thereon. The operating ring 3 is provided with pins 4 on its peripheral protrusions to operate the diaphragm by the coaction between such pin 4 and an elongated aperture associated therewith at one end of lamella 1. A pin 4a is affixed to the operating ring for anchoring one end of a spring 6 of which the other end is anchored to a pin 5 secured to the lens barrel. An L-shaped tension lever 7 is pivoted on a stub shaft 8 on the tubular lens barrel. An operating spring 9 is wound about stub shaft 8 to bias tension lever 7 clockwise. A trigger lever 10 is pivoted on a stud 10a secured to the tubular lens barrel to engage the tension lever 7 when the tension lever is tensioned by spring 11 about stud 10a on such engagement. A long arcuate coupling lever 12, provided with a hook 14, is pivoted at one end on a pivot shaft 13 riveted on tension lever 7. A pin 15 with a flattened lateral face is affixed to one of the protrusions of diaphragm operating ring 3 in a position to engage hook 14. A spring 16 is wound about pivot 13 to urge coupling lever 12 clockwise. A return lever 17 is pivotally mounted on a stub shaft 17a securely affixed to the tubular lens barrel. There is a spring 18 on stub shaft 17a to bias return lever 17 counterclockwise by means of a pin 18a secured on the lens barrel. A projection 17b is provided at one end of return lever 17 to engage with the free end of arcuate lever 12 only when the return lever is turned clockwise against its biasing spring 18. Another L-shaped lever 19, hereinafter called "the aperture controlling lever," is oscillatable about stub shaft 8 to regulate and limit the rotation of tension lever 7. Aperture controlling lever 19 is provided with a stop pin 20 at the end of its one arm, and a pin 22 at the end of its other arm to contact a cam 21 which is previously positioned since it is integral with a diaphragm preset ring which is selectively adjustable by means of a friction or click stop mechanism, as is well known in the art. A tensioning projection 23 is oscillated when the film winding and the shutter winding mechanism are manually wound to tension tension lever 7.

Figure 1:
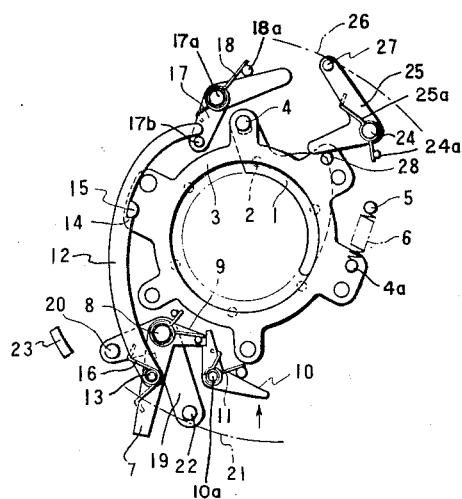
FIG. 1 illustrates a preferred embodiment according to the present invention in which the objective lens and other parts, except the diaphragm control mechanism itself, are removed.
Figure 2:
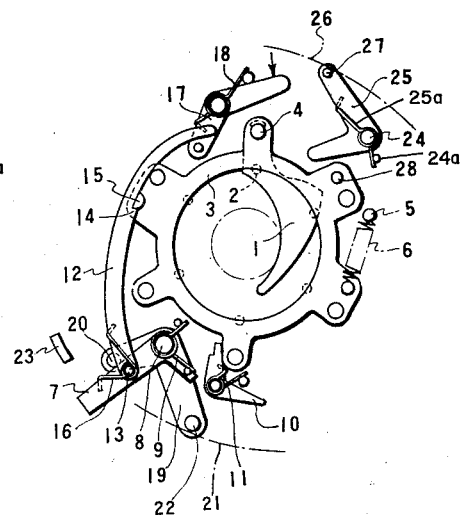
FIG. 2 illustrates the diaphragm control mechanism with the diaphragm stopped down to a predetermined aperture.

Assuming that an exposure has been made and the photographer desires to make another exposure, the shutter is tensioned with the film winding mechanism, the coupling mechanism projection 23 moves in the direction of the arrow shown in FIG. 3. The drive of this coupling mechanism may be of any prior known type, for example, a gear driving a tubular mechanism from which projection 23 extends, or a mechanism oscillating a pivoted lever or arm of which projection 23 is the free end, the arm or lever being operated by a crank coupled to the film winding mechanism. Tension lever 7 is turned counterclockwise by the downstroke of projection 23, and simultaneously hook 14 of coupling lever 12 engages pin 15, as illustrated in FIG. 1, by the action of spring 16. After urging tension lever 7 into engagement with trigger lever 10, coupling projection 23 returns to its original position.

The camera is now ready to make an exposure. The reflex mirror swings up and away from the optical path when the shutter release button is depressed, and, simultaneously with the mirror swinging upwardly, trigger lever 10 turns clockwise to release the latching engagement of tension lever 7, and tension lever 7 restores by the force of the operating spring 9. Since tension lever 7 urges coupling lever 12 to swing forthwith while maintaining the latching engagement of hook 14 with pin 15 at the original position, diaphragm operating ring 3 eventually rotates clockwise to move diaphragm lamellae 1 to form a predetermined aperture of the lens. As above stated, cam 21 is previously positioned by preselecting and setting the diaphragm preset ring, and the preset ring is selectively adjustable, as is well known in the art. Aperture controlling lever 19 is biased clockwise and maintains its fixed position by means of pin 22 and cam 21. The stop pin 20 on lever 19 engages tension lever 7 when the latter is released to restore clockwise by the force of operating spring 9 and limits the degree of rotation of lever 7 to control the magnitude of the outward swing of lever 12, and, consequently, determines the degree of rotation of diaphragm operating ring 3. The greater the rotation of the operating ring, the smaller is the aperture of the diaphragm. Then the shutter starts operating to make an exposure, and, towards termination of its exposure movement, the reflecting mirror swings down into the optical path and enables the operator to see the subject on the viewing glass. Coupled with the swinging down of the reflecting mirror, return lever 17 swings clockwise about stub shaft 17a against biasing spring 18, that is, in the direction of the arrow shown in FIG. 2, and projection 17b at one end of return lever 17 pushes the free end of lever 12 to release pin 15, affixed as aforesaid to one of the protrusions of the diaphragm operating ring, from its latching engagement with hook 14 of coupling lever 12. Thus, operating ring 3 rotates counterclockwise under the tension of return spring 6, and diaphragm lamellae 1 are turned about pivots 2, and the diaphragm aperture is again fully opened, as illustrated in FIG. 3. A lever 25 is pivoted on a stub shaft 24 secured to the lens barrel and serves to close the diaphragm from the full open aperture to the desired reduced aperture when the photographer wishes to check the depth of focus of the objective. The lever 25 has a pin 27 secured to the end of one of its arms to engage with a control cam 26 integral with a second diaphragm-adjusting ring. To secure the diaphragm stopping-down effect above described, the last mentioned ring is positioned adjacent to the diaphragm operating ring as is well known in the art. One end of a coiled spring 25a encircling pivot 24 is braced against a stud 24a secured in the lens barrel, the other end of such spring being braced against lever 25 to bias it clockwise. When the second diaphragm-adjusting ring is set clockwise to a selected position, as indicated by an f-number scale on the ring and a fixed reference mark on the lens barrel, cam 26 integral with the second diaphragm-adjusting ring is turned to swing lever 25 counterclockwise, engaging with a pin 27, and lever 25 swings diaphragm operating ring 3 clockwise to close the diaphragm, through engagement of a pin 28 mounted on diaphragm operating ring 3 with the other arm of lever 25. Hence, when the second diaphragm-adjusting ring is rotated counterclockwise, lever 25 swings clockwise turning diaphragm operating ring 3 counterclockwise under the tension of spring 6 to open the diaphragm aperture.

FIGS. 5 to 9 illustrate another embodiment of the mechanism according to the present invention in which elements identical with corresponding elements of the first described embodiment are identified by the same reference character, while reference characters which are primed therein designate elements which have the same function as the elements of the first embodiment referenced by corresponding, but non-primed, reference characters. It should be noted that the form of tension lever 7 of the instant embodiment is quite different from that of the embodiment of FIGS. 1 to 4. Tension lever 7 is provided rotatably on the tubular lens barrel overlapping diaphragm operating ring 3, that is, the center of rotation of lever 7 is on the optical axis of the objective system.

Referring more particularly to FIGS. 8 and 9, tension lever 7' is an arm extending radially from a large master annulus or ring, with operating spring 9' interposed between a projection 30 of master ring 7' and a pin 31 mounted on the lens barrel. A shoulder 32 in the outer peripheral surface of ring 7' is for engagement with trigger lever 10, while a further radial arm 33 extending therefrom is for engagement with stop pin 20 on aperture controlling lever 19, and coupling lever 12' is provided on stub shaft 13 of tension lever 7' to engage pin 15 on diaphragm operating ring 3 with hook 14' of the coupling lever.

The operation of this second embodiment of the invention will be readily understood from the above description of the operation of the first embodiment.

A third illustrative embodiment of the instant invention is shown in FIGS. 10 to 14, and is essentially a modification of the second embodiment of FIGS. 5 to 9. Diaphragm operating ring 3 is rotatably mounted on the lens barrel, and the lamellae, as also the diaphragm supporting ring, are similar in construction to those of the previously described second embodiment. In this third embodiment, diaphragm operating ring 7' is biased counterclockwise by spring 34 of which one end is anchored to pin 35 on the ring and the other end to stud 36 affixed to the lens barrel. Coupling projection 23 moves in the direction of the arrow of FIG. 13 to tension operating ring 7'. As will be noted from FIGS. 10 to 14, the curvatures of the edge regions of the lamallae are the reverse of those of both prior described embodiments so that most elements of the third embodiment are assembled according to the reversed operation thereof. Trigger lever 10 is mounted on a pivot 10' provided on the lens barrel to engage a shoulder 37 formed on master ring 7' when the tension arm is moved in the direction to tension spring 34. Coupling lever 12 is pivoted on master ring 7' by means of pivot 13. As in the prior described embodiments, hook 14 is formed on coupling lever 12 to engage pin 15 fixed on diaphragm operating ring 3. Spring 16 disposed about pivot 13 biases coupling lever 12 counterclockwise to engage hook 14 with pin 15 only when ring 7' turns counterclockwise. A release lever 39 is coaxial with trigger lever 10 and is pivoted at stub shaft 10'. A pin 38 fixed at the upper end portion of release lever 39 engages with the free end of coupling lever 12 when the release lever is turned counterclockwise. At the lower end portion of trigger lever 10 a pin 40 is provided to engage with the lower free end portion of release lever 39. Spring 11 is tensioned between trigger lever 10 and release lever 39 and biases trigger lever 10 to engage shoulder 37 of master ring 7'. V-shaped lever 25 is pivoted at pivot 24 secured to the lens barrel and limits the angular movement of tension lever 7 by means of a stop pin 28 provided at the inner free end of lever 25, a projection 41 formed on the master ring 7', a pin 27 affixed to the other, external free end of lever 25, and preset cam 26. Coupling projection 23 makes a stroke in the direction of the arrow of FIG. 13, to urge tension lever 7 to turn clockwise, and latching shoulder 37 of master ring 7' engages trigger lever 10 when winding the film to make an exposure commences, and when the film is completely wound to make an exposure, coupling projection 23 makes its return stroke.

Spring 11 is weaker than spring 16, and coupling lever 12 urges release lever 39 as shown in FIG. 10. The operation of the third embodiment is as follows: It is assumed that the shutter is wound up at which time the actual condition of the mechanism is as illustrated in FIG. 13. On winding the film, coupling projection 23 moves in the direction of the arrow shown in FIG. 13, and tension lever 7 swings clockwise and shoulder 37 of master ring 7' engages with trigger lever 10, whereupon coupling projection 23 returns to its original position. To make an exposure, the shutter release button is depressed, the reflecting mirror swings up away from the optical path, and simultaneously release lever 39 swings counterclockwise, whereby projection 40 is pushed and trigger lever 10 disengages from shoulder 37. At this time, coupling lever 12 swings clockwise around pivot 13 by the outward movement of pin 38, and hook 14 of coupling lever 12 is urged to engage pin 15 secured on diaphragm operating ring 3. In the next stage, since trigger lever 10 is disengaged from shoulder 37, master ring 7' turns counterclockwise with the lower end of lever 12 sliding over pin 38, while operating spring 34 urges diaphragm operating ring 3 to rotate counterclockwise by means of latched hook 14 and pin 15, whereby the lower end of coupling lever 12 slides beyond pin 38. The diaphragm lamellae 1 are stopped down to a desired aperture and cease moving by means of pins 28 of V-lever 25 being engaged to master ring projection 41 and pin 27 engaging cam 26 of the preset ring. The shutter operates while the diaphragm is at such stopped down aperture position, and, after the second curtain of the shutter runs down, the reflecting mirror starts to return to its original intercepting position in the optical path, and lever 39 swings clockwise. Coupling lever 12 turns counterclockwise under the action of spring 16 when release lever 39 is rotated clockwise. Now pin 15 is released from hook 14 and diaphragm operating ring 3 is rotated by spring 6 to open the diaphragm to its fully open aperture.

It should be noted that the mechanism according to the present invention may be applied not only to reflex type cameras but also to conventional viewing cameras with but a slight modification in design so that tension lever 7 is in operative relation with the shutter winding operation, and operating lever 39 is in coupling relation with the shutter release button.

As will now be understood from the above description, the mechanism according to the present invention comprises a tension lever biased by an operating spring, a trigger lever to engage the tension lever, a coupling lever operatively affixed to the tension lever or to a rotatable master ring integral with the tension lever or arm, and a diaphragm operating ring biasing the diaphragm to the fully open aperture position, the diaphragm lamellae successively closing and opening the aperture of the photographic objective by means of a special arrangement of the trigger lever and with the operating lever disposed in common with the coupling lever.

What I claim is:

1. An automatic controlling mechanism for lens diaphragms of cameras, the diaphragms being of the multilamella type with each lamella pivotable on a diaphragm ring, comprising a diaphragm operating ring for controlling the aperture of a camera lens diaphragm, an operating spring biasing the operating ring toward its full open aperture position, a tensionable member movable between a released position and a latched position and biased toward its released position, means for moving the tensionable member to its latched position, means for latching the tensionable member in its latched position, a coupling lever pivotally mounted on the tensionable member and movable thereby, means on said coupling lever cooperating with the diaphragm operating ring to rotate said ring in its aperture closing direction, a diaphragm preset cam, means including a follower for said cam for limiting the movement of the tensionable member toward its released position to limit the movement of the coupling lever, the coupling lever in turn limiting the rotation of the diaphragm operating ring; release of said latching means permitting the coupling lever to be moved by the tensionable member to rotate the diaphragm operating ring against the bias of the operating spring to close the lens aperture as determined by the diaphragm preset cam; and means for releasing the operating ring rotating means to permit the biased operating spring to return the diaphragm operating ring to its full open aperture position.

2. An automatic controlling mechanism for lens diaphragms of cameras, comprising a diaphragm operating ring for controlling the aperture of a camera lens diaphragm, an operating spring biasing the operating ring toward its full open aperture position, a tension lever movable between a released position and a latched position and biased toward its released position, means for moving the tension lever to its latched position, means for latching said tension lever in its latched position, a coupling lever pivotally mounted on the tension lever and movable thereby, means on said coupling lever cooperating with the diaphragm operating ring to rotate said ring in its aperture closing direction, an aperture controlling lever pivotally supported on a stationary portion of the lens barrel, a diaphragm preset cam for limiting the rotation of the aperture controlling lever, said aperture controlling lever acting on the coupling lever through the medium of the tension lever; release of the latching means permitting the coupling lever to be moved by the tension lever to rotate the diaphragm operating ring against the bias of the operating spring to close the lens aperture as determined by the position of the aperture controlling lever.

3. An automatic controlling mechanism for lens diaphragms of cameras, comprising a diaphragm operating ring for controlling the aperture of a camera lens diaphragm, an operating spring biasing the operating ring toward its full open aperture position, a tension lever movable between a released position and a latched position and biased toward its released position, means for moving the tension lever to its latched position, means for latching said tension lever in its latched position, a coupling lever pivotally mounted on the tension lever and movable thereby, means on said coupling lever cooperating with the diaphragm operating ring to rotate said ring in its aperture closing direction, an aperture controlling lever pivotally supported on a stationary portion of the lens barrel, a diaphragm preset cam for limiting the rotation of the aperture controlling lever, said aperture controlling lever acting on the coupling lever by way of the tension lever; release of the latching means permitting the coupling lever to be moved by the tension lever to rotate the diaphragm operating ring against the bias of the operating spring to close the lens aperture as determined by the position of the aperture controlling lever, and means for releasing the operating ring rotating means on the coupling lever to permit the biased operating spring to return the operating ring to its full open aperture position.

4. An automatic controlling mechanism for lens diaphragms according to claim 3, including independent means for rotating the diaphragm operating ring against the bias of the operating spring to close the diaphragm aperture to the opening determined by the positioning of the aperture controlling lever by the diaphragm preset cam.

5. An automatic controlling mechanism for lens diaphragms of cameras, comprising a diaphragm operating ring for controlling the aperture of a camera lens diaphragm, an operating spring biasing the operating ring toward its full open aperture position, a tension lever movable between a released position and a latched position and biased toward its released position, means for moving the tension lever to its latched position, a pivoted trigger lever biased to a latching position for latching said tension lever in its latched position, a coupling lever pivotally mounted on the tension lever and movable thereby, means on said coupling lever for rotating the diaphragm operating ring in its aperture closing direction, an aperture controlling lever pivotally supported on the camera, stop means in each arm of said last lever, one of said two stop means projecting into the path of said tension lever, a diaphragm preset ring cam for engagement by the second of said two stop means to limit the rotation of the aperture controlling lever and position the first of said two stop means to limit the movement of the coupling lever, release of the trigger lever permitting the coupling lever to be moved by the tension lever to rotate the diaphragm operating ring against the bias of the operating spring to close the lens aperture as determined by the position of the aperture controlling lever, and means for releasing the operating ring rotating means on the coupling lever to permit the biased operating spring to return the operating ring to its full open aperture position.

6. An automatic controlling mechanism for lens diaphragms of cameras, comprising a diaphragm operating ring for controlling the aperture of a camera lens diaphragm, an operating spring biasing the operating ring toward its full open aperture position, a tension lever movable between a released position and a latched position and biased toward its released position, means for moving the tension lever to its latched position, a pivoted trigger lever biased to a latching position for latching said tension lever in its latched position, a coupling lever pivotally mounted on the tension lever and movable thereby, means on said coupling lever for rotating the diaphragm operating ring in its aperture closing direction, an aperture controlling lever pivotally supported on the lens barrel, stop means in each arm of said last lever, one of said two stop means projecting into the path of said tension lever, a diaphragm preset ring cam for engagement by the second of said two stop means to limit the rotation of the aperture controlling lever and position the first of said two stop means to limit the movement of the coupling lever, release of the trigger lever permitting the coupling lever to be moved by the tension lever to rotate the diaphragm operating ring against the bias of the operating spring to close the lens aperture as determined by the position of the aperture controlling lever, means for releasing the operating ring rotating means on the coupling lever to permit the biased operating spring to return the operating ring to its full open aperture position, a second positionable cam means on the lens barrel, a follower for said second cam means, and means on said follower cooperating with the diaphragm operating ring for rotating said ring against the bias of the operating spring to close the diaphragm aperture to the opening determined by the position of the aperture controlling lever.

7. An automatic controlling mechanism for lens diaphragms of cameras having a shutter, shutter charging means, shutter release means, and lens aperture setting means, comprising a stationary diaphragm ring fixed to the lens barrel coaxially with the lens, diaphragm lamellae pivotally supported on the diaphragm ring, a diaphragm operating ring adjacent to the stationary ring to operate the diaphragm lamellae, an operating spring biasing the operating ring toward its full open aperture position, a tension lever movable between a released position and a latched position and biased toward its released position, means for moving the tension lever to its latched position upon charging the camera shutter, a pivoted trigger lever biased to a latching position for latching said tension lever in its latched position, said trigger lever being adapted to be moved to a release position by the camera shutter release means, a coupling lever pivotally mounted on the tension lever and movable thereby, means on said coupling lever for rotating the diaphragm operating ring in its aperture closing direction, an aperture controlling lever pivotally supported on a stationary portion of the lens barrel, stop means in each arm of said last lever, one of said two stop means projecting into the path of said tension lever, a diaphragm preset ring cam settable by the setting means of the camera for engagement by the second of said two stop means to limit the rotation of the aperture controlling lever and position the first of said two stop means to limit the movement of the coupling lever, release of the trigger lever permitting the coupling lever to be moved by the tension lever to rotate the diaphragm operating ring against the bias of the operating spring to close the lens aperture as determined by the position of the aperture controlling lever, and means operated immediately after the camera shutter returns to its closed position for releasing the operating ring rotating means on the coupling lever to permit the biased operating spring to return the operating ring to its full open aperture position.

8. An automatic controlling mechanism for lens diaphragms of cameras, comprising a diaphragm operating ring for controlling the aperture of a camera lens diaphragm, an operating spring biasing the operating ring toward its full open aperture position, a tension ring rotatable coaxially with the diaphragm operating ring and rotatable between a released position and a latched position, means for biasing the tension ring toward its released position, means for moving the tension ring to its latched position, a pivoted trigger lever biased to a latching position for latching said tension ring in its latched position, a coupling lever pivotally mounted on the tension ring and movable thereby, means on said coupling lever for rotating the diaphragm operating ring in its aperture closing direction, an aperture controlling lever pivotally supported on a stationary portion of the lens barrel, stop means in each arm of said last lever, one of said two stop means projecting into the path of said tension lever, a diaphragm preset ring cam for engagement by the second of said two stop means to limit the rotation of the aperture controlling lever and position the first of said two stop means to limit the movement of the coupling lever, release of the trigger lever permitting the coupling lever to be moved by the tension ring to rotate the diaphragm operating ring against the bias of the operating spring to close the lens aperture as determined by the position of the aperture controlling lever, and means for releasing the operating ring rotating means on the coupling lever to permit the biased operating spring to return the operating ring to its full open aperture position.

9. An automatic controlling mechanism for lens diaphragms of cameras, comprising a diaphragm operating ring for controlling the aperture of a camera lens diaphragm, an operating spring biasing the operating ring toward its full open aperture position, a tension ring rotatable coaxially with the diaphragm operating ring and rotatable between a released position and a latched position, means for biasing the tension ring toward its released position, means for moving the tension ring to its latched position, a pivoted trigger lever biased to a latching position for latching said tension ring in its latched position, a coupling lever pivotally mounted on the tension ring and movable thereby, means on said coupling lever for rotating the diaphragm operating ring in its aperture closing direction, an aperture controlling lever pivotally supported on the camera, stop means on the tension ring, a diaphragm preset cam, a pivoted follower member on said camera biased to engage said cam, means on said follower member cooperating with the stop means on said tension ring to limit the rotation of the tension ring in accordance with the setting of said cam; release of the trigger lever permitting the coupling lever to be moved by the tension ring to rotate the diaphragm operating ring against the bias of the operating spring to close the lens aperture as determined by the position of the follower member, and means for releasing the operating ring rotating means to permit the biased operating spring to return the operating ring to its full open aperture position.

References Cited in the file of this patent

UNITED STATES PATENTS

| | | |
|---|---|---|
| 2,213,742 | Mihalyi | Sept. 3, 1940 |
| 2,356,880 | Pignone | Aug. 29, 1944 |
| 2,503,777 | Stoiber | Apr. 11, 1950 |
| 2,803,182 | Werner | Aug. 20, 1957 |
| 2,805,610 | Haupt | Sept. 10, 1957 |

FOREIGN PATENTS

| | | |
|---|---|---|
| 1,116,327 | France | Jan. 30, 1956 |
| 1,117,941 | France | Mar. 5, 1956 |
| 204,486 | Australia | Nov. 14, 1956 |